C. W. BARNABY.
TYPEWRITER.
APPLICATION FILED AUG. 3, 1916.

1,428,130.

Patented Sept. 5, 1922.
5 SHEETS—SHEET 1.

INVENTOR.
Charles W. Barnaby
BY Knight Bros
his ATTORNEYS.

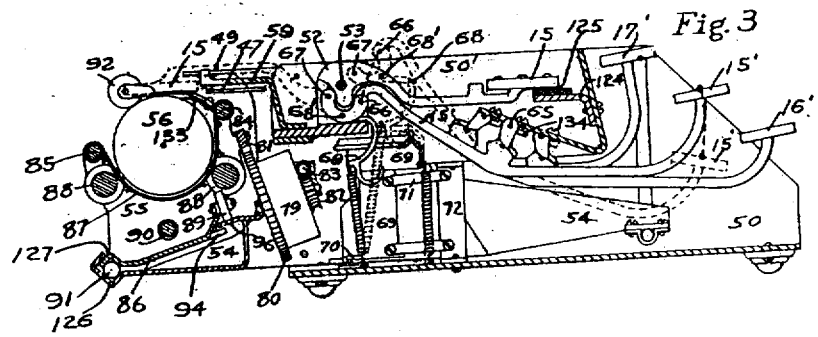
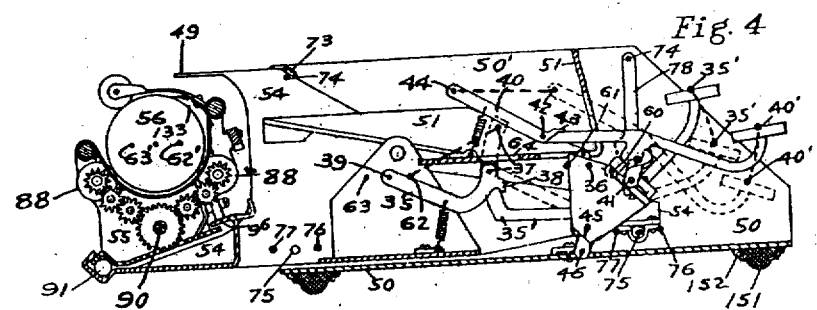
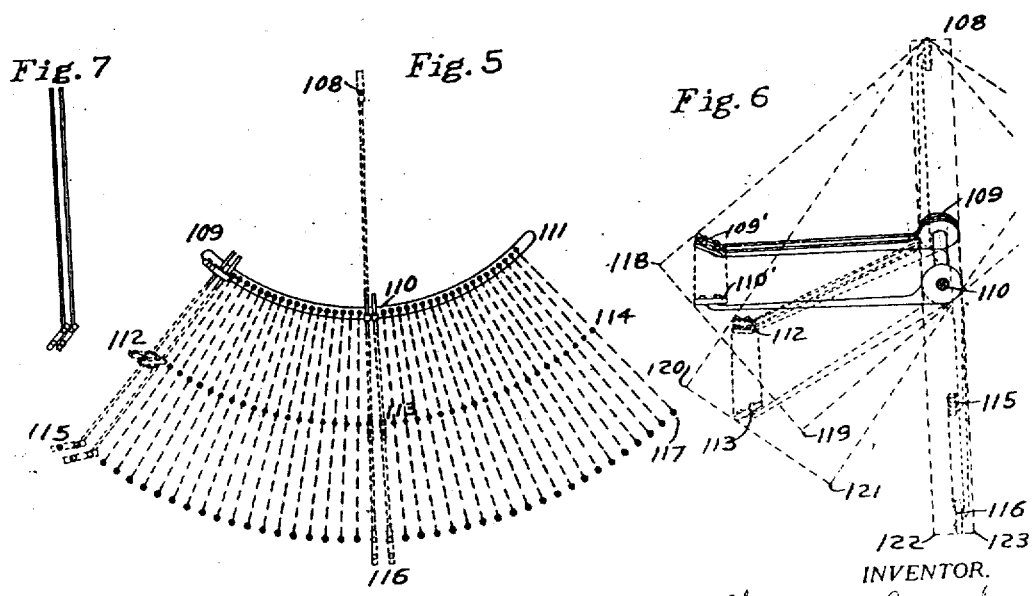

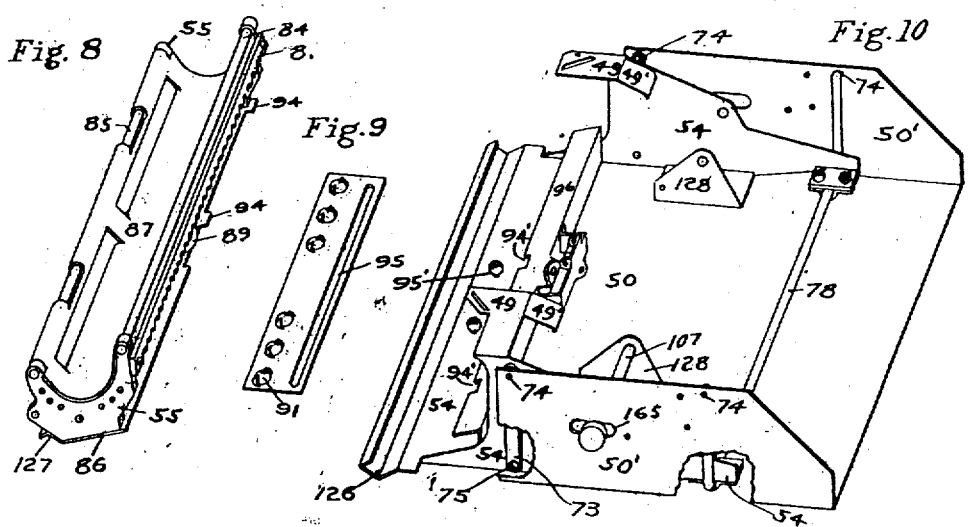
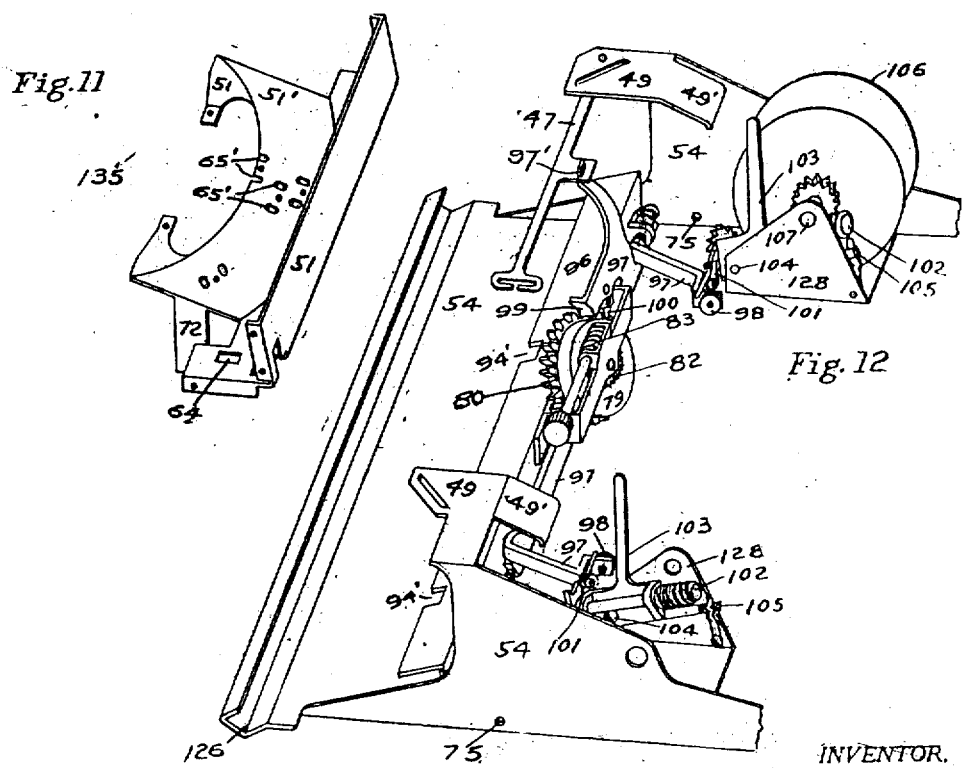

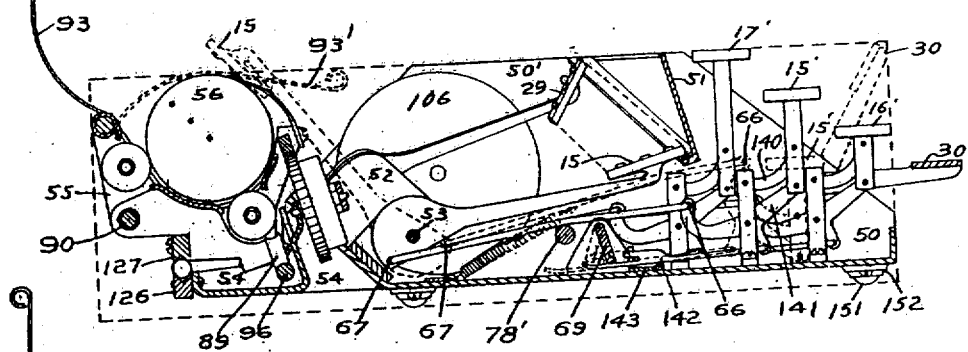
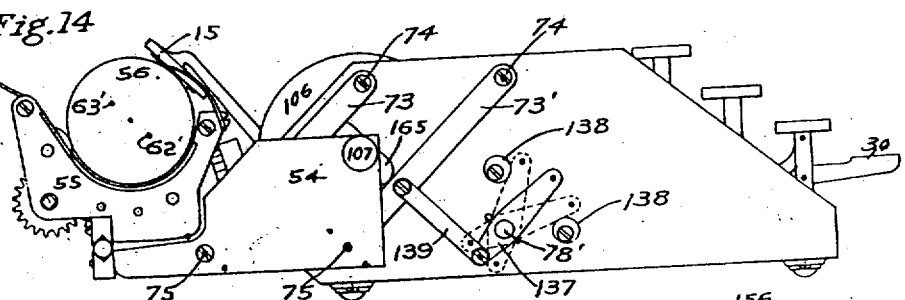
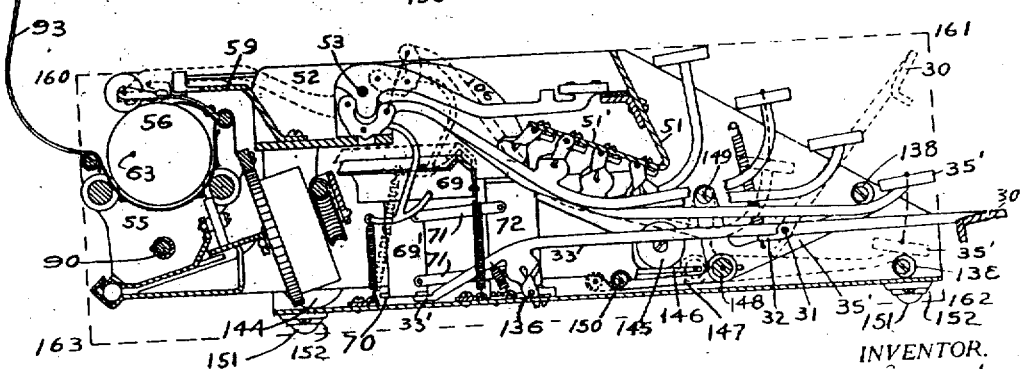

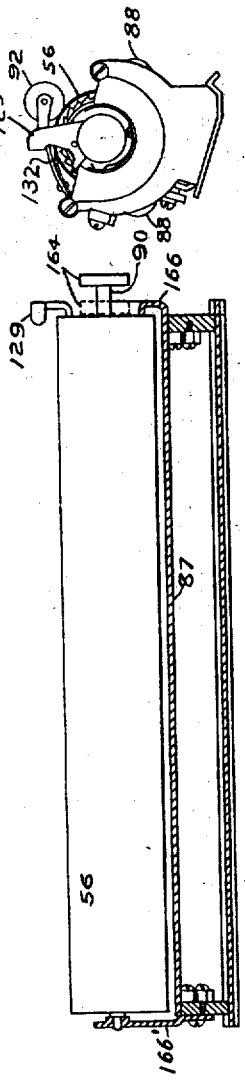
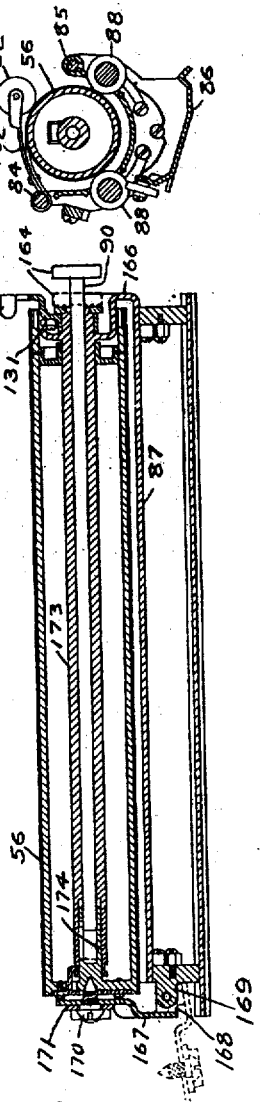
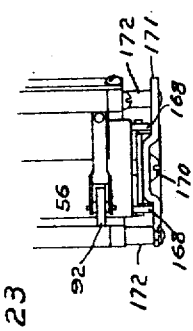
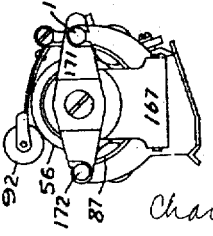

Patented Sept. 5, 1922.

1,428,130

UNITED STATES PATENT OFFICE.

CHARLES W. BARNABY, OF NEW YORK, N. Y.

TYPEWRITER.

Application filed August 3, 1916. Serial No. 112,951.

*To all whom it may concern:*

Be it known that I, CHARLES W. BARNABY, a citizen of the United States, and resident of the borough of Richmond, county of Richmond, city and State of New York, have invented certain new and useful Improvements in Typewriters, of which the following is a specification.

My invention relates more especially to typewriters of compact form which are more conveniently transported and the primary object of this invention is to provide an improved construction, combination, and arrangement of parts in a machine of small compass, which will make it possible to confine the working parts to a minimum space while at the same time securing all of the essential features of the leading standard typewriters. One of the objects of the present invention is to provide an improved arrangement of parts with respect to their relations to a standard keyboard and with a view to having said parts in their normal positions of rest, arranged within the horizontal length and vertical confines of the keyboard or so arranged as to be collapsible within said confines. Toward the attainment of the primary object referred to above, the present invention contemplates various ancillary objects of inventions related to the construction of certain mechanisms of a typewriter as will hereinafter be referred to in the body of the specification and be pointed out in the appended claims. In the present application, I do not claim the particular construction of key lever or type bar actions which are herein shown and described since they constitute the subject matters of my copending applications, Serial Numbers 128,248, filed October 28th, 1916, and 273,865, filed January 29th, 1919.

The attached drawings which form a part of the specification, illustrate the preferred embodiment of my invention in its adaptation to a so-called portable typewriter.

In the drawings:

Fig. 3 is a cross section through the center of Fig. 1;

Fig. 4 is a section on the line A—B, Fig. 1;

Fig. 5 is a diagrammatic plan view comparatively illustrating the space occupied by differently arranged banks of type bars;

Fig. 6 is a section at 116—108, Fig. 5;

Fig. 7 is a front elevation of two type bars 109, as seen from above according to Fig. 5;

Fig. 8 is a perspective view of the main body portion of the carriage;

Fig. 9 is a perspective view of the ball bearing cage for the carriage traverse;

Fig. 10 is a perspective view, partly broken away, showing the main frame with the auxiliary, or carriage supporting frame mounted therein;

Fig. 11 is a perspective view of the upper member of the main frame;

Fig. 12 is a perspective view of the auxiliary frame showing the escapement and ribbon mechanism;

Fig. 13 is a central vertical section of another embodiment of my invention;

Fig. 14 is an end elevation of the same;

Fig. 15 is a central vertical section of another embodiment of my invention;

Figs. 16 and 17 are plan and side views of a folding support for the typewriter;

Fig. 18 is a longitudinal section of a modified form of carriage, the platen mounted therein being shown in elevation;

Fig. 19 is an end view of the carriage shown in Fig. 18;

Fig. 20 is a longitudinal section of another modification of the carriage;

Figs. 21 and 22 are elevations of opposite ends of the modification shown in Fig. 20;

Fig. 23 is a fragmentary plan of one end of the embodiment shown in Fig. 20.

Figure 1:
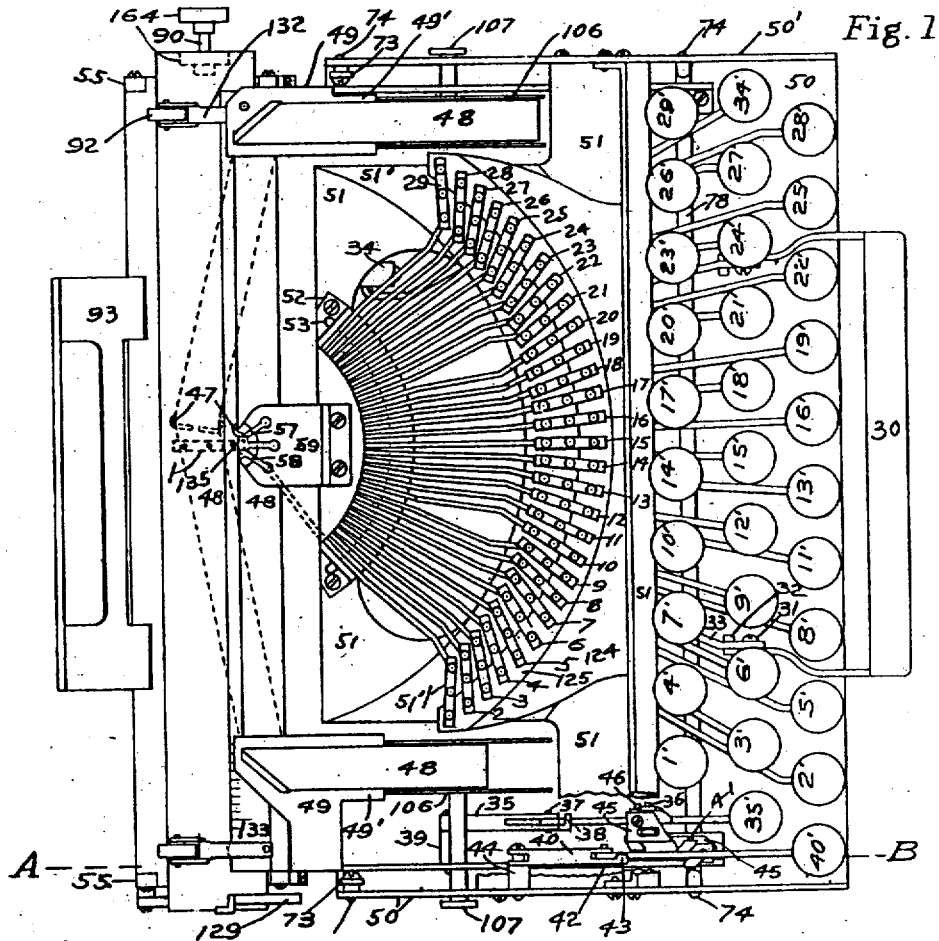
Fig. 1 is a plan view of a typewriting machine embodying the principles of my invention, parts being broken away near one end to better show the arrangement of the case shift mechanism.

Referring more particularly to the drawings, in Fig. 1, type bars 1 to 29 inclusive are operated by keys 1' to 29' inclusive. A spacing bar 30 which is pivotally connected at 31 to bar levers 33, is provided with lugs 32 which limit the spacing bar 30 in its downward movement relatively to bar levers 33 but permit said space bar to be folded into storage position shown in dotted lines in Fig. 15 in which position it does not extend beyond the front or the top limits of the main frame. When said space bar is in normal position shown in full lines, lugs 32 on the swinging portion engage the under edge of levers 33, thus limiting the downward displacement of space bar 30 relatively to and adapting space bar 30 and levers 33 to act as a rigid lever.

The case shift is shown in Figs. 1 and 4. A rocker arm 45 is pivoted on pin 46 to the main frame. Key lever 40' is pivoted on pin 41 attached to said rocker arm and its inner end is connected by pin 42 to link 40 which in turn is connected through pin 44 to the main frame. Pins 41, 42 and 44 are arranged in a straight line being held in normal position by the spring attached to link 40. A lug 43 cooperates with the top edge of lever 40' to prevent pin 42 from being drawn more than a slight distance if any, below the straight line from 41 to 44. These pivots being in a straight line the rocker arm is as securely locked against swinging as though said rocker was connected to the main frame by a single rigid link connecting pins 41 and 44. Key lever 35' is pivoted to rocker 45 on pin 36 and its inner end is connected to link 35 by pin 37 the other end of the link being connected to the auxiliary frame by the pin 39. The pins 36, 37 and 39 are arranged in a straight line and are held in this normal position by the spring attached to link 35 and by the lug 38, thus holding the auxiliary carriage in a fixed position with respect to the rocker arm and consequently in a fixed position with respect to the main frame. This is the normal, or mid position.

If key 35' is depressed into dotted line position, pin 37 will be shifted to its upper position and pin 39 attached to auxiliary frame will be drawn to position 62, shifting the center of the platen to 62' which brings it into position for the printing of the extreme inner character of the three on the type block. Upon removal of pressure from key 35' the parts return to their normal position.

If key lever 40' is depressed into dotted line position, it is obvious that inasmuch as pin 44 which carries link 40 is anchored to the main frame, rocker arm 45 will be turned on its pivot 46 in a direction toward pin 44 and will draw pin 41 to the position 60. Pin 36 on which lever 35' is pivoted will take the position 61 and pin 39 will be shifted to position 63. Pin 39 being attached to the auxiliary frame 54, the platen axis will be shifted outward to 63', putting it in printing position for the extreme end character of the type bars. Upon removing the pressure on the shift key the parts return to normal position.

It will be noted that there is an opening 64 through the floor of the upper member of the main frame directly over pin 37, said pin connecting shift lever 35' with link 35. It is therefore evident that as soon as shift key 40' is depressed a slight amount, causing rocker arm 45 to turn slightly toward the rear, the rear end of lever 35' at pin 37 starts on its movement backward under the solid part of the upper part of main frame to the rear of opening 64; it is therefore impossible to move shift key 35' downward after shift key 40' has begun to move downward, as the rear end of lever 35' is out of coincidence with opening 64.

When shift key 35' is pressed slightly downward it starts through opening 64 therefore making it impossible to move shift key 40' downward as any backward movement of the rear end of lever 35' is prevented by its coming in contact with the back of opening 64.

It is therefore clear that two sets of shift levers are interlocked against each other so that it is impossible to put either into action after the other has started to act, until the lever acted upon has returned to its normal position. It is also clear that the shift lever systems are positively locked against each other in normal position through the action of the two opposing levers and links acting on straight line pivots 36, 37, and 39 and 41, 42, and 44.

A back space key may be placed at 34' with a lever extending backward and engaging a roller arm 34 of a lever suitably engaging the escapement mechanism.

Another application of my improvement is illustrated by Figs. 13 and 14 in which the main features are substantially the same as in the embodiment before described. According to this embodiment, the type bar pivot bearing block 52 and the pivot pin 53 are placed lower down in the machine thus shifting the point of strike on the platen somewhat forward of the top. The lever action is illustrated by key 15' the stem of which is hung upon two parallel members, link 140 and one arm of lever 141, the other end of the lever being connected at 66 to a link connecting with the type bar at 67. A second arm of lever 141 extends downward and to this is connected a pusher rod 142 which is guided in a slot in member 143. When key 15' is pressed down to dotted position 15' the several connected parts take the positions indicated in dotted outline with the type in striking position on the platen and the universal bar 69 moved to the dotted position through the action of the pusher 142. Carriage roller rests upon a round rod track in place of the flat track of the preceding machine. The case shift of platen is diagonal from 62' to 63' to correspond to the angle of the type bar when in striking position 53—15. The auxiliary frame is hung on two pairs of links 73 and 73' the pair 73' taking the place of the bent shaft 78 of the previous case, so far as the hanging of the auxiliary frame is concerned. the second function of shaft 78, the maintaining of the links 73 on the opposite sides of the machine in parallel with each other, is in this case performed by a separate shaft 78' having a lever 137 on each end connected by two links 139 to the two links 73'. Shaft 78' is operated by suitable case shift mechanism, the extreme throw in each direction being regulated by adjustable stops 138 which are here shown as eccentrics clamped to the main frame by screws, and which limit the movement of a lever arm connected with lever 137.

In Figures 1 to 14 inclusive, my invention is exemplified in a double shift type of machine in which there are three characters on each type bar, and only three tiers of keys. Cross section Fig. 15 on the other hand exemplifies my invention in an adaptation to a typewriter with a standard four tier keyboard and with only two characters on each type bar, requiring but a single case shift.

The typewriter keyboard as standardized by years of use takes up, including the space bar and dip of same, a space about two and one-half inches high and about eight and one half inches long for the four tier, single shift keyboard and a slightly less height for the three tier, double shift keyboard. According to my invention the design and arrangement of the various parts of the machine are such that all of said parts are kept practically within this standard keyboard height and length while the third dimension from the front of the keyboard to the back of the platen carriage, is reduced to a minimum.

The smallest dimension of the bank of type bars, as ordinarily disposed is considerably in excess of the height of the standard keyboard.

Referring to Fig. 5, 108, 109, 110 and 111 represent a plane cutting the point of strike and pivots of a bank of typebars which are pivoted on the curved rod 109, 110. As ordinarily placed, the typebars are normally perpendicular to this plane. Only the two end bars at 109 and the two center bars at 110 are shown in this diagram, the others being represented by dots along the pivot line. Fig. 6 shows the type bars at 109' and 110' standing perpendicular to the plane 108, 109, 110. From Fig. 6 it is obvious that the least height of a rectangular space which includes a bank of type bars as well as their striking points, is represented by the dotted line 108, 118—119, rectangle being 118—108. The perpendicular type bars are arranged to conform to the surface of a cylinder whose axis is perpendicular to the plane 108, 109 and 110 and passed through the striking point at 108.

If in normal position the type bars are dropped back to an angle of about 120 degrees from the plane 108, 109, 110 111 as shown by the dotted outlines of the bars at 112, 113 the bank of bars will lie in the surface of a cone whose apex lies within the face of a cone whose apex lies within the perpendicular to the plane 108, 109, 110, 111 at the point of strike 108. This disposition of the type bars reduces the height of the minimum rectangle to that indicated by the dotted line 108—120—121.

If now, the type bars in normal position are made to assume positions 115, 116, 117, such positions being 180 degrees from the striking point, the faces of the type will lie in the plane 108, 109, 110, 111 and the depth of the space for containing the type bars will be reduced to the distance 122—123 which is the dimension across the pivot end of the typebar. The length of this rectangular space will then be the distance from point 108 to the line 122—123.

It is further obvious that as the normal position of the type bars is thrown back to a greater angle the space between the type heads is opened up, the type at 115 being twice as far apart, center to center, as at 109, as is seen by comparing the type heads at 115 with those of Fig. 7 which is an elevation of bars 109 as viewed from the axis perpendicular to 108. In passing from normal to striking position the type heads travel just twice as far from 115 to 108 as from 109 to 108; it is therefore obvious that typebars 115 may be shortened to just one-half their length and still have the same distance spread between type and the same distance of travel for a hammer blow as has type bar 109. Since these type bars will be just half as long, the rectangular space required therefor will be from 108 to 110 instead of from 122—108 (see Fig. 6) which is quite a reduction in space as compared to the space occupied by the 109', or 90 degree bank of bars.

Likewise type bars 112 acting through 120 degrees angle may be considerably shortened with respect to the 109' bars, thus greatly reducing the space which they occupy.

This angle, 120 degrees, I find to be about the least that will permit the bank of type bars to be kept within the confines of the height of the double shift keyboard. Figs. 13 and 14 illustrate how type bars operating through about 120 degrees may be located in a machine. It will be noted that the highest corner of the extreme outside type block 29 is just barely within the horizontal top line of the main frame which is on a level with the top of the top key 17' while the pivot end of the middle bar at 53 barely clears the bottom floor of the main frame as the bar swings to the striking position indicated by the dotted line of the bar 15. The top of platen 56 is also barely below the horizontal line coincident with the top of key 17'.

In the preferred application of my invention, however, I operate the type bars through an angle of about 180 degrees and I have devised a lever motion whereby I am enabled, by connecting the key lever by a single link to the type bar, to swing the type bar through this great angle with an easy, accelerated motion. This lever mechanism constitutes the subject of a separate application, Ser. No. 128,248, filed October 28, 1916.

The preferred embodiment of my invention to the double shift type of machine is illustrated in Figures 1, 2, 3, 4, 8, 9, 10, 11, and 12. According to this embodiment, the main frame comprises a bottom plate 50 provided with end plates or flanges 50′, a web or plate 51 which is supported by and ties said plates or flanges together, and suitable brackets or standards 72 which rigidly connect said web or plate to the bottom plate 50. Said web or plate 51 carries the type bar bearing block 52 and the pivot pins for the key levers, also a shelf 124 for the support of the type blocks in their normal position of rest. An auxiliary frame 54 is suspended within the main frame by means of links 73 and cranked shaft 78 which are pivoted at 74 in the end plate or flanges of said main frame, said links having their lower ends pivotally connected to the auxiliary frame at 75. The auxiliary frame carries the ribbon spools 106, the ribbon guides 49, vibrator 47, the escapement mechanism, and the carriage which is carried by the track surface 96 and the ball bearing groove 126.

The carriage consists of end frames 55 connected by two tie rods 84, 85, the concave plate 87, the bottom plate 86 and the rack 81. Balls 91 are mounted in a cage, Fig. 9, the cage being provided with a slot 95 which loosely engages the screws 95′ on the auxiliary frame which retain the cage in proper place when the carriage is removed. These screws also act as stops for the cage, the ends of slot 95 coming into engagement with the screws to prevent the cage going so far at either end of its travel as to put the balls out of proper engagement with the groove 126. When the carriage is in position its ball groove 127 rests on balls 91 in groove 126 of the auxiliary frame with the carriage wheel 89 resting on track 96. The rear wall of groove 127 is under the shelf attached to the auxiliary frame and above groove 126, and the front edge and lugs 94 of the lower carriage plate 86 is hooked under the edge of track 96 of the auxiliary frame. The carriage is thus held in proper position and prevented from accidental dislocation. When it is desired to remove the carriage it is moved slightly farther to the left than its normal working range of movement bringing the lugs 94 in coincidence with the recesses 94′ in the edge of track 96. Figs. 8 and 10, which permits the carriage to be lifted from the machine.

Figure 2:
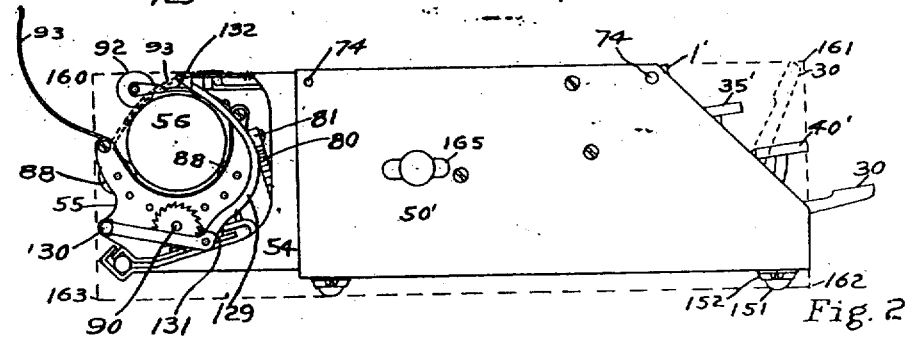
Fig. 2 is an end elevation of the same.

Platen 56 is mounted in the carriage on rollers 88, openings being provided in the concave carriage plate 87 to allow the peripheries of rollers 88 and platen 56 to contact with each other. The platen is held in contact with rollers by gravity and the spring 132 which may be provided with roller 92 to contact the platen. Springs 132 are attached to some member of the carriage, preferably to clip plate 133. This plate holds the sheet being written upon in contact with the platen close to the writing line. The clip plate is preferably graduated to coincide with the letter spacing. A paper support 93 is hinged on rod 85 of the carriage and may be folded as shown in dotted lines in Figs. 2 and 13. A suitable line spacing lever, as 129, Fig. 2, is pivoted to the carriage at 130 and carries a pawl 131 which engages a ratchet wheel on shaft 90. Shaft 90 is connected to rolls 88 through a train of gears, as indicated in Fig. 4.

My preferred form of carriage feed mechanism is indicated in Fig. 12, which consists in the main of a rocking bar and attached arms 97, pivoted at each end on pointed arbors screwed through lugs attached to auxiliary frame 54, an escapement wheel 80 which also acts as a driving gear to feed the carriage, a spring case 79 containing a clock spring the tension of which is adjusted through the worm wheel 82 and worm 83. The upward extending arm 97′ of rocking bar 97 operates the ribbon vibrator 47 and carries a double jawed dog 99 the lower jaw being adapted to enter a space between adjacent teeth of the escapement wheel, while the upper jaw at the same time enters a space between teeth of the carriage rack 81 (see Fig. 8). A dog 100 is also carried by the rocking bar 97 and engages another tooth of wheel 80. When bar 97 is in normal position as shown in Fig. 12, jaws 99 are forward of and out of engagement with the teeth of the escapement wheel. Pawl 100 is on the contrary in full engagement with a wheel tooth. In operating the escapement, bar 97 is swung on its pivots to throw the jaws 99 backward toward the platen position to such an extent as to fully engage a tooth of the escapement wheel. At the same time pawl 100 is carried backward to an extend which entirely disengages it from the escapement wheel. As soon as dog 100 is freed from engagement with the wheel it swings downward on its pivot to the extent of one tooth's space so that when bar 97 returns to its normal position it enters the space next below the one it had just left. As soon as jaw 99 releases its tooth, the escapement wheel advances one tooth space which is the limit of swing provided for in the vibrating pawl 100. Bar 97 is vibrated through the action of a suitable universal bar upon the rollers 98 pivoted to the forward extended arms 97. To these forwardly extended arms are also pivoted pawls 101 which engage ratchet wheels attached to worm shafts 102. These worms operate worm wheels attached to ribbon spools 106 to properly feed the ribbon. The ribbon spools are carried by shafts 107 mounted in the vertical end walls of auxiliary frame 54 and brackets 128 attached to same. By thus mounting the spools on edge on horizontal axes I am able to use standard spools with ribbons of standard length instead of the much shorter ribbons used on some portable machines. The ribbon, 48 Fig. 1, passes from the ribbon spools over the ribbon shelves 49' and through diagonal slots in the ribbon guides 49 and then across from one guide to the other through the slot in the end of the vibrating arm 47. Clearance slots 165 are provided in main frame for ribbon spool shafts 107 (see Figs. 2 and 10). The above described escapement mechanism constitutes the subject matter of a separate application, Serial No. 169,676, filed May 19th, 1917.

Referring to Figs. 1, 3, 11 and 15, key levers 1' to 29' are pivoted to wall 51' of upper member 51 of main frame by means of pivot pins 65 which are clamped to wall 51' by means of blocks 134 and screws tapped into same. Each key lever is provided with a pair of lugs pivoted on a pin 65. Wall 51' is a section of a hollow cone from which the type bars radiate. In Fig. 11 pairs of clearance openings 65' are shown for the pivot lugs of key levers. Only a few of the 29 pairs of openings 65' which cover the greater part of wall 51' are shown in the figure. The full lines show the key levers in their normal position. Lever 15' is pivoted to wall 51' at 65. The inner end of said lever is pivoted at 66 (see Fig. 3) to a short curved link whose other end is pivoted at 67 to type bar 15. Type bar 15 rests normally upon cushion 125 carried by shelf 124. The short link is held in normal position, preferably against the bottom of the slot in the type bar pivot block 52, by a spring attached to spring hook 68 and being thus held it in turn holds the type bar and key lever to which it is attached in normal position. When the key 15' is depressed to the position shown by dotted lines the short link takes the dotted line position 66—67 and the type bar takes the striking position shown by the dotted line 15 above the platen. The type bars are guided to exact striking position by guide 59, bars 10 to 20 falling into the center slot, 1 to 9 in slot 58 and 21 to 29 into slot 57. Spring hook 68 takes the dotted position 68. Said spring hook is provided with a curved depending arm which operates in a V groove in the universal bar 69 for raising the latter to dotted line position. A shelf 70 (see Fig. 3) suspended from the universal bar 69 by two legs 69', engages the under side of two rollers 98 (see Fig. 12), raising them and thus rocking bar 97 to perform its several functions. The universal bar is guided at each end by two links 71, one end of each of said links being pivoted to a leg 69' of the universal bar and the other end to one of the brackets or standards 72 hereinbefore referred to. From space bar 30 there extends inward at each end a lever 33 Fig. 15 pivoted by pin 136 on bottom plate 50 and having its inner end 33' in engagement with one of said legs carried by the universal bar so that when said space bar is depressed the universal bar will be elevated to operate the rocking bar 97 (see Fig. 12) and thereby cause said bar to perform its functions in the same manner as when a type key has been operated.

Fig. 15 illustrates the application of my invention to a machine having a complete standard keyboard with four rows of keys and only a single case shift for type bars bearing only two characters each. The auxiliary frame is here shown movably mounted in the main frame by means of wheels instead of parallel links, wheel 144 being axled on the auxiliary frame and rolling on the bottom plate of the main frame. Wheel 145 is axled on the main frame and is engaged by a flat surface 146 attached to the auxiliary frame. The weight of the carriage, platen and other parts making the weight of the auxiliary frame to the rear of roller 144 heavier than the part toward the front of the machine, the pressure is upward against wheel 145. Wheels 144 and 145 are duplicated on the other side of the frames. Two case shift levers 35' are attached rigidly to shaft 148, one at each end, and short arms of the levers extending upward are pivoted to the main frame at 149 at each side. A link 147 at each side of the machine connects shaft 148 with the auxiliary frame at 150. When key 35' is depressed to dotted position its lever swings on screws 149, bringing lever, shaft and link to the position shown in dotted line shifting the center of the platen to 63'. Other parts of this machine are practically the same as the one first described and require no further explanation.

When space bar 30 and paper rack 93 are folded to their dotted positions no part of the machine extends outside of the rectangle indicated by the dotted lines 160, 161, 162, 163 of Figs. 2, 13 and 15. The feet of these machines consist of cushions 151 held by sockets 152 screwed to the bottom of the frame. By using a collapsible or folding foot the height of the machine may be still further reduced.

Figs. 16 and 17 show a folding foot, 50 being portion of the floor plate of the main frame. The socket 152 which holds pad 151 instead of being secured directly to 50 is attached to a separate member 153 which is provided with two lugs 154. These lugs are pivoted on pin 155 which is clamped by member 156 to the floor plate 50. An opening 159 is provided in the floor plate through which member 153 passes when swung on its pivot to the position shown in dotted outline in Fig. 17 where it is stopped in its upward movement by the stop lug 157. The plan view Fig. 16 shows the foot in this folded position. Spring 158 presses one of the lugs 154 to hold the foot in whichever of the two positions it may be placed.

With my construction and arrangement of the various members within the main frame I am enabled to keep the main frame and attachments down to a length of about nine inches, which I find is about the minimum length that will house a standard keyboard with shift and back space keys similar to that shown in Fig. 1. Having established the minimum length practicable for the main frame it is desirable to employ a form of carriage and platen which also meets standard requirements and which does not exceed this length.

The usual length of the written line of standard type writer is about seven and one fourth inches, or 73 characters and the usual width of letter paper is eight or eight and one half inches. I have devised several forms of carriage and platen to meet these conditions.

As it is frequently desired to address long envelopes or write on other long articles, I prefer to use the open end carriage with pivotless platen, shown and described in my Patent 1,186,268, and have shown this type of carriage and platen in connection with the several machines shown in the drawings. Other forms of carriage and platen may be used, however, notably the improved mount shown in my copending application Serial No. 95,612, filed May 5, 1916, now Patent 1,226,626, May 26, 1917, in which the platen is placed in a carriage which is closed at one end only, the other end being open so that work of any length can be inserted.

In Figs. 18 and 19 is shown a modification in the application of my improvement above referred to, by means of which I am able to mount a platen pivoted at both ends in a carriage with closed ends which will receive sheets of eight and one half inches width with comfortable clearance and still not exceed in length the nine inch width of the main frame. This I accomplish by making the end walls 166 and 166' of the carriage as thin as practicable, keeping every member which the edges of the sheet would come into contact with, as the body of line space lever 129, within the planes of the two surfaces of each of the walls 166 and 166' and by placing the ratchet and other members within the platen, as in the improvement described and claimed in my copending application Serial Number 95,612 above referred to. With this construction there is nothing to interfere with the edges of the paper until they come into contact with one of the carriage end walls 166 or 166'.

Figs. 21, 20, 22 and 23, show another form of carriage incorporating features of the application last referred to, the principal platen control members being arranged within the platen. The closed end of carriage 166 and the body of lever 129 are arranged within the same planes, having the sleeve 173 extending from and rigidly attached to rigid end 166 of the carriage, the outer end of said sleeve receiving an inwardly extended pivot 174 of the platen to support the outer end of said platen. This long sleeve support, while sufficiently rigid for writing purposes is not sufficiently rigid to avoid danger of being accidentally strained, particularly during transportation. As a matter of safety I therefore prefer to provide a hinged pivot standard 167 for the outer end of the platen. This standard is pivoted by the two lugs 168 on a pin in lug 169 attached to the end frame of the carriage. The screw 170 in the top of the standard has a pointed end upon which the platen is pivoted, it also has a shouldered portion under its head which abuts against the face of standard 167 and forms a bearing upon which lever 171 is pivoted. Each end of this lever is provided with a slotted recess to engage circular grooves turned in the ends of posts 172, thus holding the standard in position with pivot 170 in proper engagement with its bearing in the end of the platen. This carriage like that shown in Fig. 18 will take ordinary letter paper between the closed end of carriage 166 and standard 167 with ample clearance. In case it is desired to address a long envelope or write on other long articles, lever 171 is turned on its pivot 170 until its end recesses are disengaged from their grooves in posts 172, when standard 167 may be dropped to the position shown in dotted outline in Fig. 20, leaving the end of the carriage entirely open so that the article being written upon may extend any desired distance outside of the end of the carriage. The carriage improvements described in the two last paragraphs immediately preceding, constitute the subject matter of a separate application, Serial No. 169,677, filed May 19th, 1917.

164 in Figs. 1, 18 and 20, is an extensible handle for operating the platen and is mounted on a shaft 90 having an endwise adjustment so that handle 164 may be pushed into position indicated by the dotted outline 164, within the limits of the space occupied by the major elements of the machine, so as not to interfere with placing the machine in a case of minimum size. This telescoping handle, is shown and described in Patent No. 1,186,268, granted to me, and in my copending application Serial Number 667,537, filed December 23, 1911, which has matured into Patent 1,198,097, dated September 12th, 1916.

I claim:

1. In a typewriter, stepped rows of keys, a platen lying below and substantially tangent to the horizontal plane of the top row of keys, type-bars connected to said keys and operating on said platen, and a paper rack pivoted on an axis below said plane and movable on said axis into folded position below said plane.

2. In a typewriter, the combination with a platen, of means for mounting said platen, laterally spaced ribbon spools rotatable on horizontal axes adjacent the horizontal plane of the axis of said platen, a bank of type-bars operatively related to said platen, a key-board comprising keys operatably connected to said type-bars, the platen mounting means, spools, and type-bars being arranged intermediately of the upper and lower horizontal planes of said key-board, and a space bar adapted to be folded within the limiting vertical and horizontal planes of the key-board.

3. In a small space typewriting machine, a keyboard comprising rows of keys arranged in steps, a bank of type-bars, means connecting said type-bars to said keys, a platen, and platen feeding mechanism, all of said parts being disposed between a horizontal plane substantially coinciding with the plane reached by a key in the lowermost row in its depressed position and a second horizontal plane substantially coinciding with the upper limit of said keyboard.

4. In a typewriter, a keyboard comprising key levers disposed within the height of a standard row-step and dip of keys, said keyboard having the length of a standard spacing of said keys from one end to the other of each row, a platen, means for mounting said platen, a bank of type bars, and means for connecting said type bars to said keyboard, said parts having relative positions with respect to each other and with respect to said keyboard, to position and arrange all of said parts between horizontal planes corresponding respectively to the uppermost position of any key in the top row and the lowermost position of any key in the bottom row and between vertical planes substantially coinciding with the end limits of said keyboard.

5. In a typewriter, a keyboard comprising keys disposed within the height of a standard row-step and dip of keys, a platen, platen mounting means, type bars, means for operatably connecting said keys and type bars, said platen, platen mounting means, type bars, and operating connections between said keys and type bars having relative dispositions with respect to each other and with respect to the horizontal planes corresponding to the uppermost positions of the top row of keys and the lowermost position of the bottom row of keys, to position and arrange all of the parts referred to between said planes above referred to, and a space bar normally positioned forward of said keyboard but adapted through its construction to be moved into position between said planes and between the forward limit of said keyboard and said platen.

6. In a typewriter, the combination of a platen, means for mounting said platen, a handle operatably connected to said platen, said handle being adapted by its connection to be adjusted longitudinally of the axis of said platen, a bank of type-bars, a keyboard of the minimum height required for the normal row step, dip and clearance of the type-bar-operating keyed-levers, and a main frame of the minimum length and height adapted to house said key-board and accommodate said dip, said platen, mounting means, adjustable handle and type-bars being normally or collapsibly within the confines of the length and height of said main frame.

7. In a typewriter, a bank of type-bars, a key-board of the minimum height required for the normal row, step, dip and clearance of the type-bar-operating key-levers, a main frame of the minimum length and height adapted to house said keyboard, said main frame being limited in its forward extension by the vertical plane tangent to the forward periphery of the rims of the foremost key caps of said keyboard, an auxiliary frame, shiftably mounted in said main frame, a carriage reciprocally mounted in said auxiliary frame, a platen mounted in said carriage, an escapement means for controlling the reciprocating movement of said carriage, and a foldable space bar operatably connected with said escapement means and normally extending forward of the forward limits of the main frame, the type-bars, auxiliary frame, carriage, platen, escapement means and space bar being normally or adjustably within the limits of length, height and forward extension of the main frame.

8. In a typewriter, a bank of key levers, a main frame the upper limit of which is in approximately the same plane as the upper limiting plane of said bank of key levers, an auxiliary frame movably connected to said main frame and between the top and bottom plane of said main frame, said bottom frame of the main frame being adjacent to the lowermost tier of keys in depressed position, a platen rotatably mounted on said auxiliary frame, and located between the top and bottom planes of said main frame, type-bars operatably related to said platen, said type-bars being normally disposed between the top and bottom planes of said bank of key levers.

9. In a typewriter, a bank of key levers, a main frame, the upper limit of which is in approximately the same plane as the upper limiting plane of said bank of key levers, an auxiliary frame movably connected to said main frame and between the top and bottom plane of said main frame, said bottom plane of the main frame being adjacent to the lowermost tier of keys in depressed position, a platen rotatably mounted on said auxiliary frame and located between the top and bottom planes of said main frame, type-bars operatably related to said platen, said type-bars being normally disposed between the top and bottom planes of said bank of key levers, said movable connection between the main and auxiliary frames comprising a parallel-link mechanism disposed between the top and bottom of said main frame.

10. In a typewriter, a bank of key levers, a main frame, the upper limit of which is in approximately the same plane as the upper limiting plane of said bank of key levers, an auxiliary frame movably connected to said main frame and between the top and bottom plane of said main frame, said bottom plane of the main frame being adjacent to the lowermost tier of keys in depressed position, a platen rotatably mounted on said auxiliary frame and located between the top and bottom planes of said main frame, type-bars operatably related to said platen, said type-bars being normally disposed between the top and bottom planes of said bank of key levers, and ribbon spools mounted on horizontal axes adjacent opposite ends of said main frame.

11. In a typewriter, a bank of key levers, a main frame, the upper limit of which is in approximately the same plane as the upper limiting plane of said bank of key levers, an auxiliary frame movably connected to said main frame and between the top and bottom plane of said main frame, said bottom plane of the main frame being adjacent to the lowermost tier of keys in depressed position, a platen rotatably mounted on said auxiliary frame, and located between the top and bottom planes of said main frame, type-bars operatably related to said platen, said type-bars being normally disposed between the top and bottom planes of said bank of key levers and ribbon spools mounted on horizontal axes and disposed intermediately of said type-bars and the ends of said main frame and between the upper and lower horizontal planes of said bank of key levers.

12. In a typewriter, the combination of a main frame, of an auxiliary frame, one of said frames being provided with slots and the other of said frames being provided with pins movable in said slots, links pivotally connected at opposite ends to said frames, a carriage reciprocable on said auxiliary frame, a platen rotatably mounted on said carriage, and means for imparting a shifting movement to said auxiliary frame.

13. In a typewriter, the combination of a main frame, of an auxiliary frame, one of said frames being provided with slots and the other of said frames being provided with pins movable in said slots, links pivotally connected at opposite ends to said frames a carriage reciprocable on said auxiliary frame, a platen rotatably mounted on said carriage, and means for imparting a shifting movement to said auxiliary frame, said auxiliary frame extending beyond one edge of the main frame.

14. In a typewriter, the combination of a main frame, of an auxiliary frame, one of said frames being provided with openings and the other of said frames being provided with pins extending through said openings, guiding means connecting said frames together, a carriage reciprocable on said auxiliary frame, a platen rotatably mounted on said carriage, and means for imparting a shifting movement to said auxiliary frame.

15. In a typewriter, the combination, of a main frame, of an auxiliary frame, one of said frames being provided with openings and the other of said frames being provided with pins extending through said openings, guiding means connecting said frames together, a carriage reciprocable on said auxiliary frame, a platen rotatably mounted on said carriage, and means for imparting a shifting movement to said auxiliary frame, said auxiliary frame being adapted to support the carriage adjacent to one edge of the main frame.

16. In a typewriter, the combination of a main frame, of an auxiliary frame, one of said frames being provided with slots and the other of said frames being provided with pins movable in said slots, links pivotally connected at opposite ends to said frames, a carriage reciprocable on said auxiliary frame, a platen rotatably mounted on said carriage, means for imparting a shifting movement to said auxiliary frame, ribbon spools journaled on said pins, and means for operating said ribbon spools.

17. In a typewriter, the combination of a main frame, of an auxiliary frame, one of said frames being provided with slots and the other of said frames being provided with pins movable in said slots, links pivotally connected at opposite ends to said frames, a carriage reciprocable on said auxiliary frame, a platen rotatably mounted on said carriage, means for imparting a shifting movement to said auxiliary frame, ribbon spools journaled on said pins, and means for operating said ribbon spools, said auxiliary frame projecting rearwardly from the main frame.

18. In a typewriter, a keyboard having the length of a standard spacing of said keys from end to end of said keyboard, a platen contained between spaced vertical planes coinciding substantially with the end limits of said keyboard, means for mounting said platen, a bank of type bars, means for connecting said type bars to said keyboard, said platen, platen mounting means, type bars, and connecting means having relative dispositions with respect to each other and with respect to said keyboard whereby all of said parts are arranged between said planes, and a space bar normally positioned forward of said keyboard but adapted through its connections to be adjusted to a position back of the normal extreme forward limit of said keyboard and within the space included between two horizontal planes coincident respectively with the top and bottom limits of said keyboard.

19. In a typewriter, a bank of type-bars, a key-board of minimum depth consistent with a standard step row to row and a standard dip of keys, said keyboard comprising key-levers operatably connected to said type-bars, a platen, means for mounting said platen, and a case-shifting mechanism, said case-shifting mechanism including paired parallel links pivotally mounted at one end on a fixed pivot and pivotally connected at the other end to said platen mounting means, said type-bars, platen, platen mounting means, and shifting mechanism being entirely confined between the horizontal plane defining the topmost limit of said keyboard and the horizontal plane defining the lowermost limit reached by said key-levers in depressed position.

20. In a typewriter, the combination of a bank of keys, of a main frame the upper plane of which substantially coincides with the upper plane of said bank of keys and the lower plane of which is limited to approximately the lowest plane reached by any of said keys, type bars arranged intermediately of said planes, an auxiliary frame, a platen carried by said auxiliary frame, and case-shifting means connected to said auxiliary frame, said auxiliary frame, platen, and case-shifting means being located between the upper and lower planes of said main frame.

21. In a typewriter, the combination of a bank of keys, of a main frame the upper plane of which substantially coincides with the upper plane of said bank of keys and the lower plane of which is limited to approximately the lowest plane reached by any of said keys, type bars arranged intermediately of said planes, an auxiliary frame, a platen carried by said auxiliary frame, and case-shifting means connected to said auxiliary frame, said case-shifting means including links movable about fixed pivots and pivotally connected to said auxiliary frame, said auxiliary frame, platen, and case-shifting means being located between the upper and lower planes of said main frame, with its attachments and mountings, said platen, fittings and mountings being normally or collapsibly within the confines of the length and height of said main frame and having a minimum extension beyond the width of paper which they will receive.

22. In a typewriter, a keyboard of the minimum height consistent with a standard row step and dip of keys, a bank of type-bars operatively connected with the major part of the keys of said keyboard, a main frame of the minimum length adapted to house said keyboard and extending a minimum clearance distance below said keyboard, a space bar foldable within the confines of the length of said main frame and within the height of said keyboard and within an upward extension of the front vertical plane of the type-bar operating portion of said keyboard, and a platen and its mountings, the type-bars and platen and mountings being suitably arranged to be normally or collapsibly within the confines of parallel perpendicular planes coincident with the extreme ends of said main frame, and within extensions of the horizontal planes defining the uppermost limit of said keyboard and the lowermost part of said main frame.

23. In a small space typewriting machine, a standard keyboard comprising operating keys arranged in standard rows and standard steps with mounting stems and levers having a minimum downward extension below the top of the lower row of said keys, a bank of type-bars, operating means connecting each type-bar with its respective operating key, a platen mounted in operating relation with said type-bars, a feed mechanism in operating engagement with said platen, and a space-bar in operating connection with said feed mechanism, said space-bar being normally positioned in front of said keyboard, but adapted through means of its connections to be adjustable within the normal forward extension and normal upward extension of said keyboard.

24. In a typewriter, a bank of keys, type bars connected thereto and arranged intermediately of the upper and lower planes of said keys, a platen, and a paper rack pivotally mounted on an axis between said planes and lying wholly within said planes in folded position.

25. In a typewriter, a keyboard comprising key levers arranged in standard row-step, normal dip and clearance, a bank of type bars operatably connected to said key levers and disposed between the upper and lower limits of said keyboard, a platen and mountings for same disposed between the upper and lower limits of said keyboard and positioned in operating relation to said type-bars, and case shifting means arranged between said upper and lower limits whereby all of said parts are confined to the space between the horizontal planes reached by said key levers.

26. In a typewriter, the combination of a standard keyboard of the minimum height consistent with a normal row step, key dip and minimum clearances of the type-bar-operating key levers and of the minimum length consistent with the normal lengthwise-of-the-keyboard spacing of the key levers comprising said keyboard, a main frame of the minimum length that will house said keyboard, a carriage reciprocably and shiftably connected with said main frame and contained within the upper and lower limits defined by the horizontal planes and extensions of the same coincident respectively with the lowermost part of said main frame and with the uppermost limit of said key-board, and a platen mounted in said carriage within said lower and upper limits whereby all of said parts are confined between said horizontal planes.

27. In a typewriter, a bank of type-bars, case-shifting means, a space bar, and a keyboard comprising key-levers operatably connected with said type-bars and key-levers operatably connected with said case-shifting means, said type-bar-operating key-levers being arranged in steps of standard drop, and having a normal dip and minimum clearances, said type-bars, shifting means, space bar, and key-levers operating said shifting means being disposed between the horizontal planes defining the uppermost and lowermost points reached by the key-levers operating said type-bars, said space bar being foldable to a position within the confines of said horizontal planes and backward of the foremost limit of the keys which operate said type-bars.

28. In a typewriter, a bank of type-bars, case-shifting means, back-spacing means, a space bar, and a keyboard comprising key-levers operatably connected with said type-bars, key-levers operatably connected with said case-shifting means, and a key-lever operatably connected with said back-spacing means, said type-bar-operating levers being arranged in steps of standard drop and having a normal dip and minimum clearances, said type-bars, shifting means, key levers operating said shifting means, back-spacing means, key-levers operating said back-spacing means, and said space bar being disposed between the horizontal planes defining the uppermost and the lowermost points reached by the key-levers which operate said type-bars, said space bar being foldable to a position within the confines of said horizontal planes and backward of the foremost limit of the keys which operate said type-bars.

29. In a typewriter, a standard keyboard, a main frame of the minimum length and height adapted to house said keyboard, a bank of typebars, an auxiliary frame movably connected to said main frame and constrained to move substantially in a plane parallel with the face of the heads of said typebars, a carriage mounted reciprocably in said auxiliary frame, and a platen rotatably mounted on said carriage, said type-bars, auxiliary frame, carriage, and platen being normally substantially within the confines of the length and height of said main frame.

30. In a typewriter, the combination with a key-board of the minimum height consistent with a standard row step and dip of keys, of a main frame of the minimum length adapted to house said keyboard and extending a minimum clearance distance below said keyboard, a bank of type-bars normally within the length of said main frame and within the height of said keyboard, and a platen with its attachments and mountings, said platen, attachments and mountings being normally or collapsibly within the confines of parallel perpendicular planes coincident with the extreme ends of said main frame and extensions of said planes and within the horizontal planes coincident with the lowermost part of said main frame and coincident with the uppermost limit of said keyboard and extensions of said horizontal planes and having a minimum extension beyond the width of paper which they will receive, whereby all of said parts are confined to the space limited by said planes.

31. In a typewriter, the combination with a keyboard of the minimum height consistent with a standard row step and dip of keys, of a main frame of the minimum length adapted to house said keyboard and extending a minimum clearance distance below said keyboard, a bank of type-bars, ribbon spools mounted on axes at either side of said bank of type-bars, and a platen and its mountings, the type-bars, ribbon spools, and platen and mountings being so arranged that they are normally or collapsibly within the confines of parallel perpendicular planes coincident with the extreme ends of said main frame and extensions of said planes and within the horizontal planes coincident respectively with the lowermost part of said main frame and uppermost limit of said keyboard and extensions of said horizontal planes, whereby all of said parts are confined to the space limited by said planes.

32. In a typewriter, a keyboard of the minimum height consistent with a standard row step and key dip, a bank of type-bars operatively connected with the major part of the keys of said keyboard and disposed within the limits of the upper and lower horizontal planes of said keyboard, a main frame extending a minimum clearance distance below said keyboard and not higher than the upper limit thereof, a platen and its mountings arranged to be normally or collapsibly within the confines of the planes coincident respectively with the bottom of said main frame and uppermost part of said keyboard, and a recessional foot adapted to be depressed within the confines of said limiting planes, all of said parts having relative dispositions with respect to each other and with respect to said keyboard, whereby they are confined to the space limited by said planes.

33. In a typewriter, the combination of a main frame, an auxiliary frame movably mounted in said main frame, one of said frames being provided with slots and the other with pins movable in said slots, ribbon spools journalled on said pins, and means for imparting rotary motion to each of said spools at different times.

34. In a typewriter case shifting mechanism, two links in toggle relation with each other, one extreme pivot being held stationary and the other extreme pivot being directly attached to the member to be shifted, said links being adapted when the three pivots are in an approximately straight line relation with each other, to hold the member to be shifted in a fixed position, and a key lever integral with one of said toggle links and adapted to break said toggle to cause said member to be shifted to another position.

35. In a typewriter, a case-shifting mechanism comprising a rocker arm, a key lever pivotally mounted on said rocker arm, a link pivotally connected to said key lever, said link being mounted to swing about a fixed pivot, a second key lever pivotally mounted on said rocker arm, a second link pivotally connected to the second lever arm, and a movable platen-shifting frame pivotally connected to said second link said lever arms being adapted in normally at rest position to hold said platen-shifting frame at rest.

36. In a typewriter, a case-shifting mechanism comprising a rocker arm, a key lever pivotally mounted on said rocker arm, a link pivotally connected to said key lever, said link being mounted to swing about a fixed pivot, a second key lever pivotally mounted on said rocker arm, a second link pivotally connected to the second lever arm, and a movable platen-shifting frame pivotally connected to said second link, said lever arms being adapted in normally at rest position to hold said platen-shifting frame at rest, the operation of one of said lever arms being adapted to prevent the operation of the other lever arm.

37. In a typewriter, a standard keyboard consisting of case shifting and type-bar operating key-levers, said keyboard being of the minimum height consistent with normal row step, key dip and minimum clearance of the type-bar-operating key-levers and of the minimum length consistent with the normal lengthwise-of-the-keyboard spacing of the key-levers comprising said keyboard, a main frame of the minimum length that will house said keyboard, said main frame extending a minimum distance below said keyboard and not above the uppermost part of said keyboard, a bank of type-bars, operating means connecting each of said type-bars with its respective key-lever, a carriage reciprocably connected with said main frame and placed in operating relation to said type-bars a platen mounted in said carriage, and case shifting means in operating connection with its portion of said keyboard, said type-bars, type-bar operating means, carriage and connections, platen, and case shifting means all being arranged normally or collapsibly within approximately the length of said main frame and within the space included between the horizontal plane coincident with the lowest part of said main frame and the horizontal plane coincident with the uppermost part of said keyboard.

38. In a typewriter, a standard keyboard consisting of case shifting, back spacing and type-bar operating key-levers, said keyboard being of the minimum height consistent with normal row step, key dip and minimum clearance of the type-bar-operating key-levers and of the minimum length consistent with normal lengthwise-of-the-keyboard, a main frame of the minimum length that will house said keyboard, spacing of the key-levers comprising said keyboard, said main frame extending a minimum clearance distance below said key-board and upwardly within the height of said keyboard, a bank of type-bars, operating means connecting each of said type-bars with its respective key-lever, a carriage reciprocably connected with said main frame and placed in operating relation to said type-bars, a platen mounted in said carriage, case shifting means in operating connection with its portion of said keyboard and back spacing means in operating connection with its portion of said keyboard, said type-bars, type-bar operating means, carriage and connections, platen, case shifting and back spacing means all being arranged normally or collapsibly within approximately the length of said main frame and within the space included between the horizontal plane 39. In a typewriter, the combination with a fixed frame, of a movable platen-shifting frame, and a pair of key operated levers connected to said platen-shifting frame for shifting it into different positions, said fixed frame being provided with portions which interlock with said levers at different times, the operation of either of said key-operated levers being adapted to move one of said levers into suitable position with respect to said fixed frame to cause the other of said levers to be blocked against action.

40. In a typewriter, a keyboard of the minimum height consistent with a standard row step and key dip, a main frame of the minimum length adapted to house said keyboard, and extending a minimum clearance distance below said keyboard, a platen, means for mounting said platen, a bank of type-bars, and a case shifting means, said platen, means for mounting said platen, bank of type-bars and case-shifting means being normally or collapsibly within the confines of parallel perpendicular planes and extensions thereof coincident with the extreme ends of said main frame and the horizontal planes coincident with the lower part of said main frame and the uppermost part of said keyboard or extensions of said horizontal planes, whereby all of said parts are confined to the space limited by said planes.

41. In a typewriter, a keyboard of the minimum height consistent with a standard row step and key dip, a main frame of the minimum length adapted to house said keyboard and extending a minimum clearance distance below said keyboard, an auxiliary frame movably mounted in said main frame, a carriage reciprocally mounted in said auxiliary frame, a platen rotatably mounted in said carriage, a bank of type-bars, and a case shifting means connecting said main frame with said auxiliary frame, said auxiliary frame, carriage, platen, bank of type-bars and case-shifting means being normally or collapsibly within the confines of parallel perpendicular planes coincident with the extreme ends of said main frame and the horizontal planes coincident with the lower part of said main frame and the uppermost part of said keyboard and extensions of said perpendicular and horizontal planes.

42. In a typewriter, a keyboard of the minimum height consistent with a standard row step and key dip, a main frame of the minimum length adapted to house said keyboard and extending a minimum clearance distance below said keyboard, an auxiliary frame movably mounted in said main frame, a drop end carriage reciprocally mounted in said auxiliary frame, a platen rotatably mounted in said carriage, a bank of type-bars, and a case-shifting means, said auxiliary frame, carriage, platen, type-bars, and case-shifting means being normally or collapsibly within the the confines of parallel perpendicular planes coincident with the extreme ends of said main frame and the horizontal planes coincident respectively with the lower part of said main frame and the uppermost part of said keyboard and extensions of said perpendicular and horizontal planes.

43. In a typewriter, a keyboard of the minimum height consistent with a standard row step and key dip, a main frame of the minimum length adapted to house said keyboard and extending a minimum clearance distance below said keyboard, an auxiliary frame movably mounted in said main frame, a drop end carriage reciprocally mounted in said auxiliary frame, a platen rotatably mounted in said carriage, a bank of type-bars, ribbon spools pivoted on axes at the sides of said type-bar bank, and a case-shifting means, said auxiliary frame, carriage, platen, type-bars, ribbon spools and case-shifting means being normally or collapsibly within the confines of parallel perpendicular planes coincident with the extreme ends of said main frame and the horizontal planes coincident respectively with the lower part of said main frame and uppermost part of said keyboard and extensions of said perpendicular planes.

44. In a typewriter, a keyboard of the minimum height consistent with a standard row step and key dip, a main frame of the minimum length adapted to house said keyboard and extending a minimum clearance distance below said keyboard, an auxiliary frame movably mounted in said main frame, a carriage reciprocally mounted in said auxiliary frame, a platen rotatably mounted in said carriage, a bank of type-bars in operative relation with said platen and operatably connected with the major portion of said keyboard, and a paper rack pivotallly mounted on an axis within the rear of said carriage and foldable forward to a position overlying said platen, said auxiliary frame, carriage, platen, type-bars and paper rack being normally or collapsibly within the rectangular prismoidal space bounded by the two horizontal planes coincident with the lowermost part of said main frame and the uppermost part of said keyboard, the two parallel vertical planes coincident with the ends of said main frame, and the two parallel vertical planes coincident respectively with the extreme front part of said keyboard and extreme backward part of said carriage.

45. In a typewriter, a fixed frame, a case shifting frame movably mounted in said fixed frame, and a pair of lever systems connecting said main frame with said movable frame for shifting the latter frame into different positions, said main frame being provided with an engaging portion in close corner to corner relation with an engaging portion of one of said lever systems, said latter engaging portion having a movement in one direction when one lever system is operated and a movement in a transverse direction when the other lever system is operated, a slight movement of either lever system being adapted to move said engaging portion of said lever systems into such relation with said main frame engaging portion as to lock the other lever system against movement.

46. In a typewriter, a fixed frame, a platen shifting frame movably mounted in said main frame, and a pair of lever systems connecting said main frame with said movable frame for shifting the latter frame into different positions, said main frame being provided with a portion in close corner to corner relation with a portion of one of said lever systems, said latter portion having a movement in one direction when one lever system is operated and a movement in a transverse direction when the other lever system is operated, a slight movement of either lever system being adapted to move the other lever system into position to be locked against movement until the actuated lever system has returned to normal position.

47. In a typewriter, the combination of a standard keyboard consisting of back spacing and type bar operating key levers, said keyboard being of the minimum height consistent with a normal row step, key dip and minimum clearances of the type-bar-operating key levers and of the minimum length consistent with the normal lengthwise-of-the-keyboard spacing of the key levers comprising said keyboard, a main frame of the minimum length that will house said keyboard, a carriage reciprocably and shiftably connected with said main frame and contained within the upper and lower limits defined by the horizontal planes and extensions of the same coincident respectively with the lowermost part of said main frame and with the uppermost limit of said keyboard, and a platen mounted in said carriage within said lower and upper limits whereby all of said parts are confined to the space between said planes.

48. In a typewriter, the combination of a standard keyboard consisting of case shifting and type bar operating key levers, said keyboard being of the minimum height consistent with a normal row step, key dip and minimum clearances of the type-bar-operating key levers and of the minimum length consistent with the normal lengthwise-of-the-keyboard spacing of the key levers comprising said keyboard, a main frame of the minimum length that will house said keyboard, a carriage reciprocally and shiftably connected with said main frame and contained within the upper and lower limits defined by the horizontal planes and extensions of the same coincident respectively with the lowermost part of said main frame and with the uppermost limit of said keyboard and a platen mounted in said carriage within said lower and upper limits, whereby all of said parts are confined to the space between said planes.

49. In a typewriter, the combination of a standard keyboard consisting of back spacing, case shifting and type-bar operating key levers, said keyboard being of the minimum height consistent with a normal row step, key dip and minimum clearances of the type-bar-operating key levers and of the minimum length consistent with the normal lengthwise-of-the-keyboard spacing of the key levers, comprising said keyboard, a main frame of the minimum length that will house said keyboard, a carriage reciprocably and shiftably connected with said main frame and contained within the upper and lower limits defined by the horizontal planes and extensions of the same coincident respectively with the lowermost part of said main frame and with the uppermost limit of said keyboard, and a platen mounted in said carriage within said lower and upper limits, whereby all of said parts are confined to the space between said planes 50. In a typewriter, the combination with a keyboard comprising keys disposed within the height of a standard row-step and dip of keys, a platen disposed between the horizontal planes of the uppermost positions of the top row of keys and the lowermost positions of the bottom row of keys, platen mounting means disposed between said planes, a bank of type bars arranged between said planes, laterally spaced ribbon spools arranged between said planes on axes adjacent said platen, and means disposed between said planes for operatably connecting said keys and type bars, whereby all of the parts referred to are confined between horizontal planes determined by the uppermost and lowermost positions of the top and bottom rows respectively of said keys.

51. In a typewriter, the combination with a keyboard comprising keys and their attached levers disposed within the height of a standard row-step and dip of keys, a platen disposed between the horizontal plane corresponding to the uppermost position of any of the top row of keys, and the plane corresponding to the lowermost position reached by any of said keys and connected levers, platen mounting means disposed between said planes, a bank of type bars arranged said planes, and means disposed between said planes for operatably connecting said keys and type bars, whereby all the 52. In a typewriter, a keyboard comprising key levers disposed within the height of a standard row-step and dip of keys, a platen disposed within the horizontal planes corresponding to the uppermost and lowermost key levers, means disposed between said planes for mounting said platen, case shifting means disposed between said planes, and a bank of type bars disposed between said planes and operatably connected to said key levers, whereby all of said parts are arranged between the horizontal planes determined by the uppermost positions of the top row of key levers and the horizontal plane determined by the lowermost positions of the bottom row of key levers.

53. In a typewriter, a keyboard comprising keys and their attached levers disposed within the height of a standard row-step and dip of keys, a platen disposed between the horizontal planes determined by the uppermost positions of the top row of keys and the lowermost position reached by said keys and levers, platen mounting means disposed between said planes and rotatably engaging the periphery of said platen, a key operated case-shifting means disposed between said planes and operatably connected to said platen mounting means, and a bank of type bars operatably connected to said key levers, all of said parts having relative dispositions whereby they are arranged between said planes.

54. In a typewriter, a keyboard of the depth of a standard step from row to row and a standard dip of keys, a platen disposed between a horizontal plane defining the lowermost limit reached by the key levers in depressed positions, means disposed between said planes for mounting said platen, and a case-shifting mechanism operatably connected to said platen mounting means, the above mentioned parts having a relative arrangement whereby all of said parts are confined to the space between said planes.

55. In a typewriter, a keyboard comprising keys disposed within the height of a standard row-step and dip of keys and of the length of a standard spacing of said keys from one end to the other of said keyboard, a main frame of length adapting it to house said keyboard and extending a minimum clearance distance below said keyboard, a space bar foldable within the confines of the length of said main frame and between the horizontal plane determined by the top and bottom rows of said keyboard, a platen and means for mounting the same disposed between the horizontal planes corresponding to the top of said keyboard and bottom of said main frame, and a bank of type bars operatably connected with the major part of the keys of said keybard, whereby all of said parts are normally or collapsibly confined to the space defined by parallel planes corresponding to the top of said keyboard and the bottom of said main frame and the parallel planes perpendicular thereto and corresponding to the ends of said main frame.

56. In a typewriter, a keyboard comprising key levers arranged in standard row-step, normal dip and mimimum clearance, a bank of type bars operatably connected to said key levers and disposed between the upper and lower limits of said keyboard, and case shifting means arranged between said upper and lower limits, all of said parts having a relative arrangement whereby they are confined to the space between the horizontal planes reached by said key levers.

57. In a typewriter, a keyboard of standard compass comprising key-levers arranged in standard row-steps and spaced relations, mounting means for said key-levers extending a minimum clearance distance beyond the ends of said keyboard a bank of type bars operatably connected to said key levers and a platen and mountings for same having standard paper width capacity and arranged normally or collapsibly between the ends of said keyboard whereby all of said parts are confined to the space between the two perpendicular planes spaced a minimum clearance distance outside the ends of said keyboard.

58. In a typewriter, a keyboard of standard compass comprising key levers arranged in standard row-steps and spaced relations and including a minimum clearance space beyond the endmost key at each end of said keyboard, a bank of type bars operatably connected to said key levers and confined within the space between the end limits of said keyboard, a platen and mounting means for the same having standard paper width capacity and arranged normally or collapsibly between the end limits of said keyboard, means for mounting said key levers, type bars, and platen mounting means, all of said parts having a relative arrangement with respect to each other and with respect to said keyboard, whereby, they are confined within the space between the ends of said keyboard.

59. In a typewriter, rows of keys, type-bars connected to said keys and arranged between the upper plane of the top row of keys and the lower plane of the bottom row of keys in normal position of rest, a platen disposed between said planes for receiving the impact of said type bars, and a paper rack pivotally mounted to swing into folded position between said planes.

CHARLES W. BARNABY.